US012770506B2

(12) United States Patent
Ikefuji et al.

(10) Patent No.: US 12,770,506 B2
(45) Date of Patent: Oct. 20, 2026

(54) APPARATUS, METHOD, AND NON-TRANSITORY COMPUTER-READABLE MEDIUM FOR DETERMINING VEHICLE CHARACTERISTICS BASED ON VIBRATIONS SENSED USING OPTICAL FIBER

(71) Applicant: NEC Corporation, Tokyo (JP)

(72) Inventors: Daisuke Ikefuji, Tokyo (JP); Takashi Matsushita, Tokyo (JP); Murtuza Petladwala, Tokyo (JP); Hemant Shivsagar Prasad, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/862,994

(22) PCT Filed: May 25, 2022

(86) PCT No.: PCT/JP2022/021343
§ 371 (c)(1),
(2) Date: Nov. 5, 2024

(87) PCT Pub. No.: WO2023/228299
PCT Pub. Date: Nov. 30, 2023

(65) Prior Publication Data
US 2025/0292676 A1 Sep. 18, 2025

(51) Int. Cl.
*G08G 1/04* (2006.01)
*G08G 1/01* (2006.01)
*G08G 1/015* (2006.01)

(52) U.S. Cl.
CPC ............ *G08G 1/04* (2013.01); *G08G 1/0116* (2013.01); *G08G 1/0129* (2013.01); *G08G 1/015* (2013.01)

(58) Field of Classification Search
None
See application file for complete search history.

(56) References Cited

U.S. PATENT DOCUMENTS

2005/0085987 A1* 4/2005 Yokota ................ B60C 23/0477 73/146
2018/0342156 A1 11/2018 Martin et al.
(Continued)

FOREIGN PATENT DOCUMENTS

JP 2004-527030 A 9/2004
JP 2021-121917 A 8/2021
WO 2020/116030 A1 6/2020

OTHER PUBLICATIONS

International Search Report for PCT Application No. PCT/JP2022/021343, mailed on Aug. 16, 2022.

*Primary Examiner* — Brian P Sweeney
*Assistant Examiner* — Jonathan E Reinert
(74) *Attorney, Agent, or Firm* — NEC-IPC

(57) ABSTRACT

Provided is a travelling vehicle detection apparatus including: a measurement unit that that measures a continuous physical quantity at a predetermined place using an optical fiber sensor laid along a road, a detection unit that detects a temporal change pattern of the physical quantity from a measurement result of the measurement unit, and a determination unit that determines whether there is a travelling vehicle based on the change pattern of the physical quantity. Here, the physical quantity is a vibration intensity, and the change pattern is a change in absolute value, a change in difference, a change in ratio, or a change in graph shape.

9 Claims, 16 Drawing Sheets

(56) References Cited

U.S. PATENT DOCUMENTS

| | | | | |
|---|---|---|---|---|
| 2022/0172611 | A1* | 6/2022 | Turato | H04B 10/073 |
| 2024/0302229 | A1* | 9/2024 | Lindsey | G01D 5/35361 |

* cited by examiner

TABLE 1

| | REFERENCE POINT (669) | | | REFERENCE POINT + 1 (670) | | | REFERENCE POINT − 1 (668) |
|---|---|---|---|---|---|---|---|
| TIME | 1 | 2 | 3 | 1 | 2 | 3 | 1 |
| 0~10Hz | 100 | 300 | 550 | 50 | 150 | 400 | 320 |
| 10~30Hz | 150 | 450 | 500 | 260 | 230 | 450 | 570 |
| 30~50Hz | 200 | 500 | 500 | 410 | 300 | 480 | 550 |
| CHANGE BEFORE 1 HOUR AT 0 TO 10 Hz | 30 | 200 | 250 | 5 | 100 | 250 | -100 |
| CHANGE BEFORE 2 HOURS AT 0 TO 10 Hz | 5 | 10 | 450 | 8 | 11 | 350 | -250 |
| CHANGE AFTER 1 HOUR AT 0 TO 10 Hz | -200 | -250 | 150 | -100 | -250 | 50 | 10 |
| DISTANCE DIFFERENCE +1 AT 0 TO 10 Hz | 50 | 150 | 150 | 20 | 100 | 200 | -220 |
| DISTANCE DIFFERENCE -1 AT 0 TO 10 Hz | -220 | 50 | 150 | 50 | -150 | -150 | 8 |

Fig. 9

TABLE 2

| | DETECTION RATE (%) | | FALSE DETECTION RATE (%) | |
|---|---|---|---|---|
| | DETECTED LANE | OPPOSITE LANE | DETECTED LANE | OPPOSITE LANE |
| RELATED METHOD | 97 | 68 | 3 | 30 |
| METHOD OF PRESENT DISCLOSURE | 100 | 91 | 0 | 18 |

Fig. 10

WHEN VEHICLE IS PASSING

APPARATUS, METHOD, AND NON-TRANSITORY COMPUTER-READABLE MEDIUM FOR DETERMINING VEHICLE CHARACTERISTICS BASED ON VIBRATIONS SENSED USING OPTICAL FIBER

This application is a National Stage Entry of PCT/JP2022/021343 filed on May 25, 2022, the contents of all of which are incorporated herein by reference, in their entirety.

TECHNICAL FIELD

The present invention relates to a travelling vehicle detection apparatus, a travelling vehicle detection method, and a non-transitory computer-readable medium.

BACKGROUND ART

A method for detecting a travelling vehicle using optical fiber sensing has been developed. Patent Literature 1 discloses a traffic monitoring optical fiber sensor including a former comprising an elongate plate, and an optical fiber wound onto at least one surface of the elongate plate. In Patent Literature 1, the elongate plate is flexible in a direction perpendicular to the at least one surface, such that passage of traffic over the optical fiber sensor is arranged to cause a variation in at least one predetermined property of an optical signal transmitted through the optical fiber sensor. As a result, Patent Literature 1 discloses that the sensor has a narrow width to be easily disposed within a road surface, high flexibility to be adapted to the road surface, and good cross-axis sensitivity rejection.

CITATION LIST

Patent Literature

Patent Literature 1: Japanese Unexamined Patent Application Publication No. 2004-527030

SUMMARY OF INVENTION

Technical Problem

Patent Literature 1 discloses an improvement in sensitivity of an optical fiber from a physical aspect. However, there is a problem that cannot be solved if only the sensitivity is simply increased. Therefore, there is room for improving the sensitivity of the optical fiber from a soft aspect.

An object of the present disclosure is to provide a travelling vehicle detection apparatus, a travelling vehicle detection method, and a non-transitory computer-readable medium capable of improving sensitivity from a soft aspect in sensing a travelling vehicle using an optical fiber.

Solution to Problem

A travelling vehicle detection apparatus of the present disclosure includes:

- a measurement unit configured to measure a continuous physical quantity at a predetermined place using an optical fiber sensor laid along a road;
- a detection unit configured to detect a temporal change pattern of the physical quantity from a measurement result of the measurement unit; and
- a determination unit configured to determine whether there is a travelling vehicle based on the change pattern of the physical quantity.

A travelling vehicle detection method of the present disclosure includes:

- measuring a continuous physical quantity at a predetermined place using an optical fiber sensor laid along a road;
- detecting a temporal change pattern of the physical quantity from a measurement result of the measurement; and
- determining whether there is a travelling vehicle based on the change pattern of the physical quantity.

A non-transitory computer-readable medium of the present disclosure records a program for causing a travelling vehicle detection apparatus to execute:

- measuring a continuous physical quantity at a predetermined place using an optical fiber sensor laid along a road;
- detecting a temporal change pattern of the physical quantity from a measurement result of the measurement; and
- determining whether there is a travelling vehicle based on the change pattern of the physical quantity.

Advantageous Effects of Invention

According to the present disclosure, it is possible to provide a travelling vehicle detection apparatus capable of improving sensitivity from a soft aspect in sensing a travelling vehicle using an optical fiber.

BRIEF DESCRIPTION OF DRAWINGS

FIG. 9 is a diagram illustrating Table 1 according to an example.

FIG. 10 is a diagram illustrating Table 2 according to the example.

EXAMPLE EMBODIMENT

Example Embodiments

Figure 1:
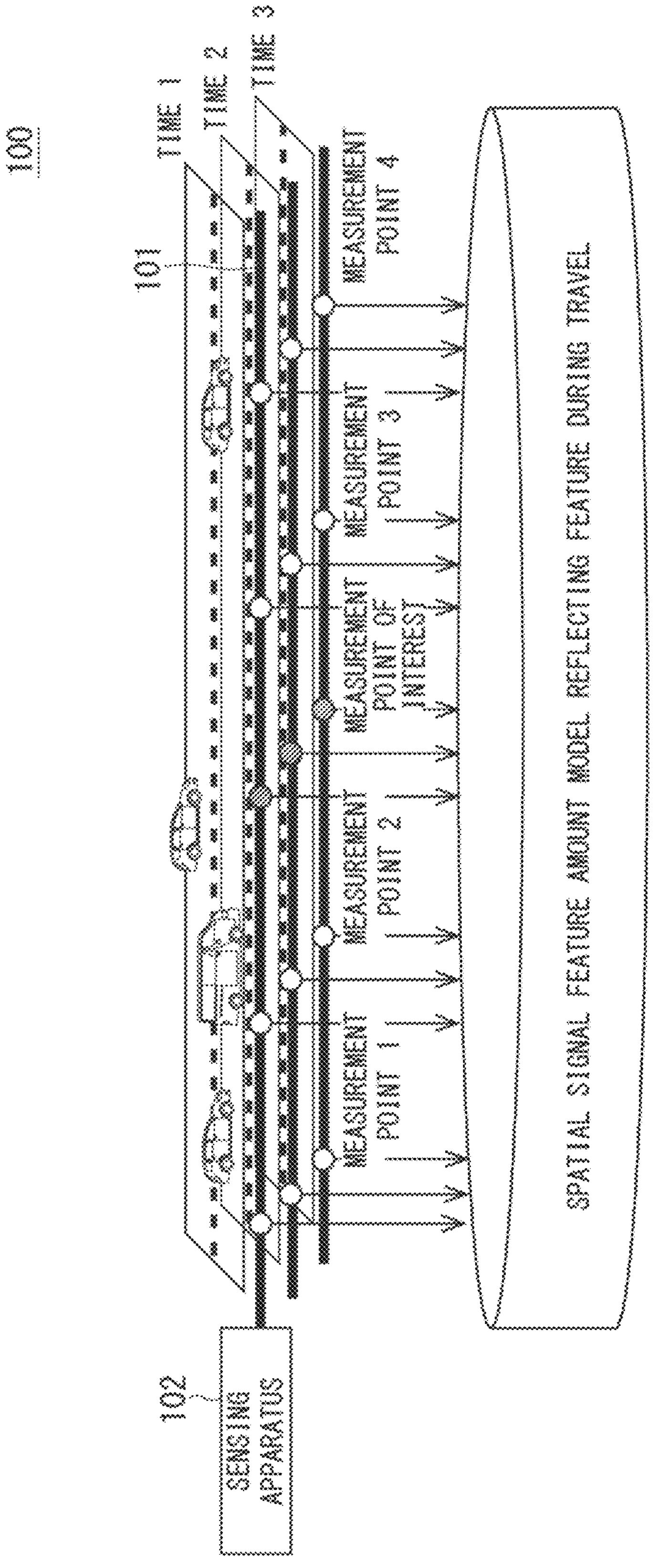
FIG. 1 is a schematic diagram of a travelling vehicle detection apparatus according to an example embodiment.

Hereinafter, example embodiments of the present invention will be described with reference to the drawings. However, the invention according to the claims is not limited to the following example embodiments. Not all the configurations described in the example embodiments are essential as means for solving the problem. To clarify description, omission and simplification are made as appropriate in the following description and drawings. In the drawings, the same elements are denoted by the same reference numerals, and repeated description is omitted as necessary.

(Related Optical Fiber Sensing Apparatus)

Figure 12:
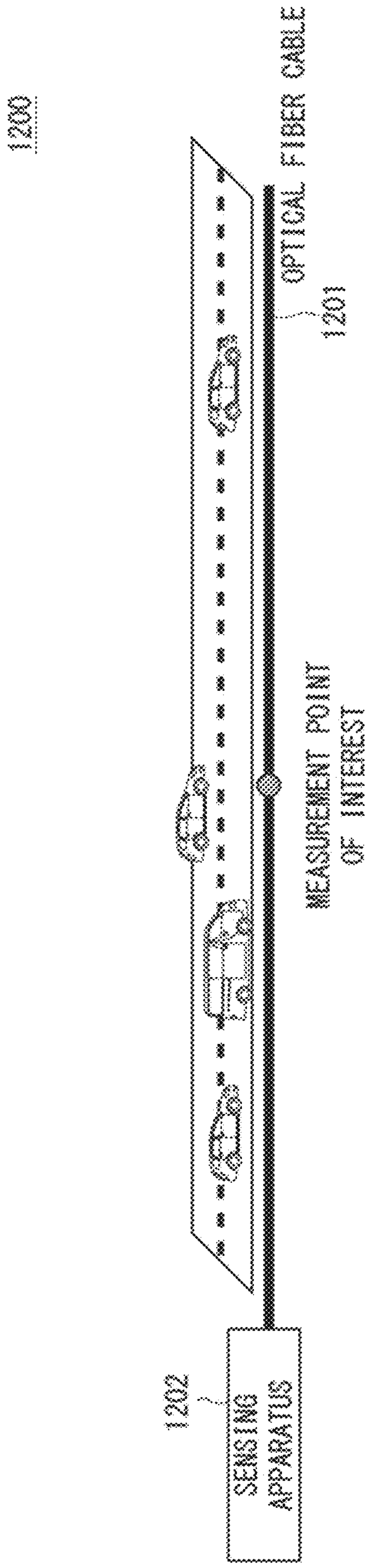
FIG. 12 is a schematic diagram of a related optical fiber sensing apparatus.
Figure 13:
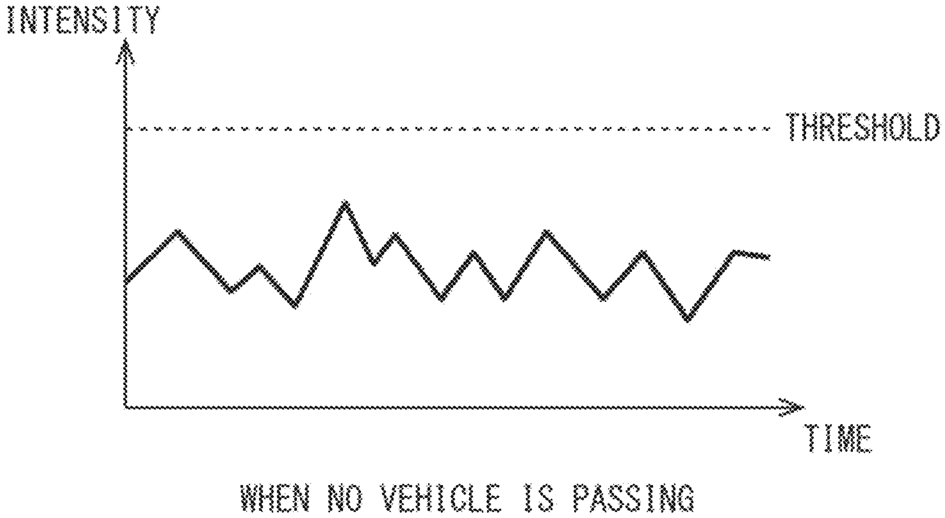
FIG. 13 is a diagram illustrating a result of measurement by optical fiber sensing in a case where no vehicle is passing.
Figure 14:
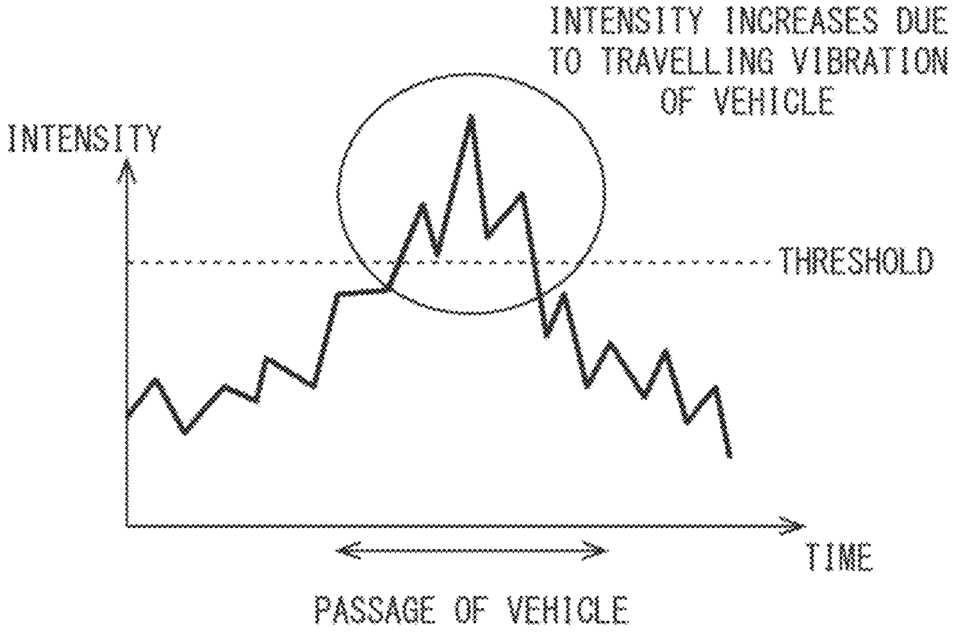
FIG. 14 is a diagram illustrating a result of measurement by optical fiber sensing in a case where a vehicle is passing.
Figure 15:
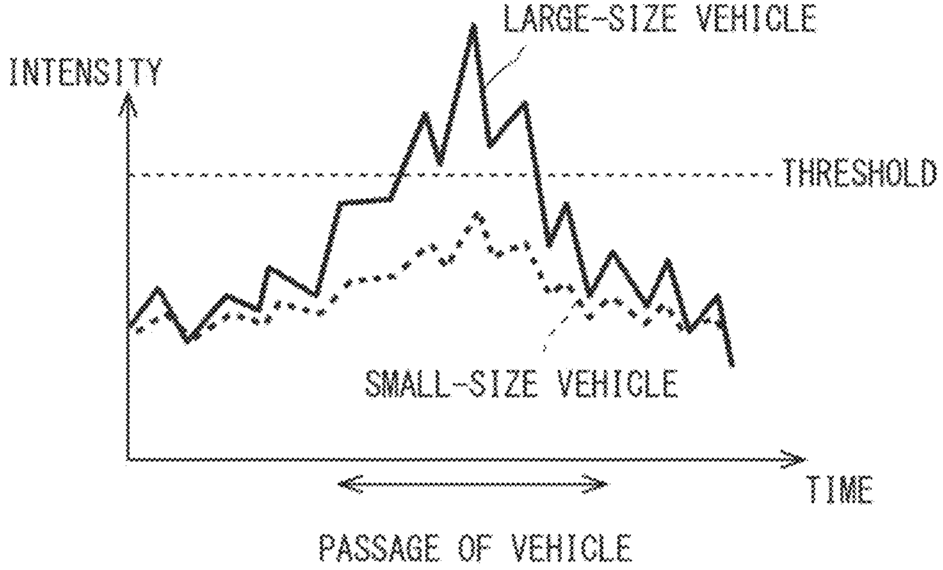
FIG. 15 is a diagram illustrating a result of measurement by optical fiber sensing in a case where vehicles of different types are passing.
Figure 16:
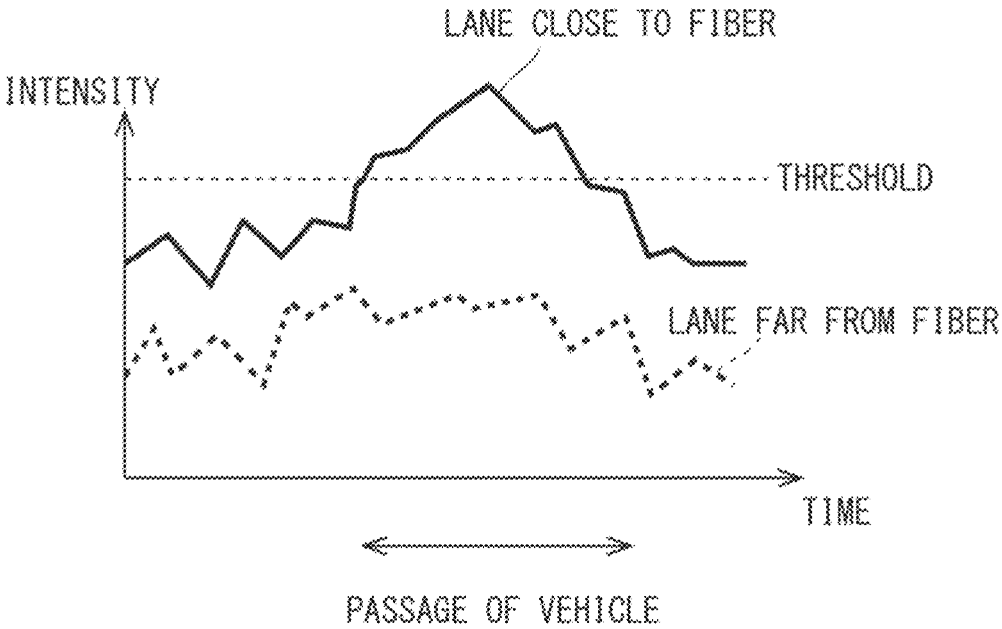
FIG. 16 is a diagram illustrating a result of measurement by optical fiber sensing in a case where vehicles are passing on different lanes.
Figure 17:
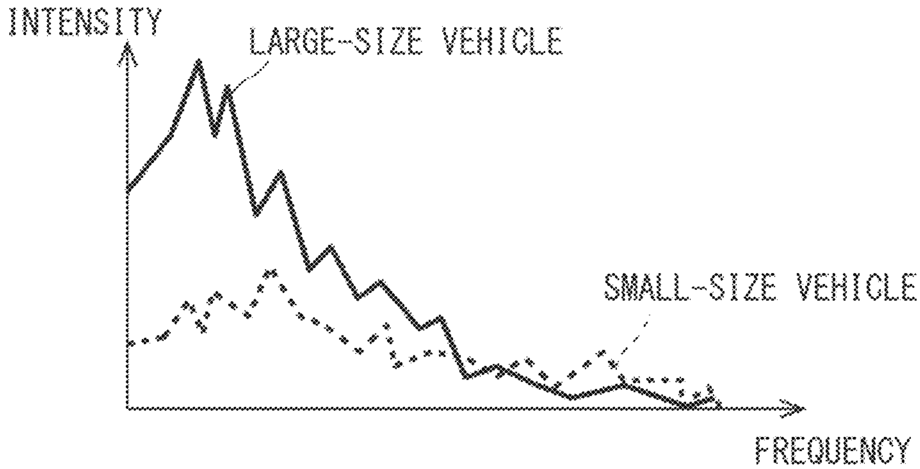
FIG. 17 illustrates a result of measuring a frequency characteristic by optical fiber sensing in a case where vehicles of different types are passing.

FIG. 12 is a schematic diagram of a related optical fiber sensing apparatus. FIG. 13 is a diagram illustrating a result of measurement by optical fiber sensing in a case where no vehicle is passing. FIG. 14 is a diagram illustrating a result of measurement by optical fiber sensing in a case where a vehicle is passing. FIG. 15 is a diagram illustrating a result of measurement by optical fiber sensing in a case where vehicles of different types are passing. FIG. 16 is a diagram illustrating a result of measurement by optical fiber sensing in a case where vehicles are passing on different lanes. FIG. 17 illustrates a result of measuring a frequency characteristic by optical fiber sensing in a case where vehicles of different types are passing. The related optical fiber sensing apparatus will be described with reference to FIGS. 12 to 17.

As illustrated in FIG. 12, an optical fiber sensing apparatus 1200 includes an optical fiber cable 1201 laid along a road and a sensing apparatus 1202 connected to a terminal thereof. The optical fiber cable passes probe light such as laser light emitted from the sensing apparatus 1202.

Here, a case where a vehicle is travelling on a road is considered. In a case where the vehicle passes through a measurement point of interest, vibration occurs in the optical fiber cable 1201. Then, a change occurs in phase and intensity of backscattered light of the light passing through the optical fiber cable 1201 at the measurement point of interest. By detecting the phase and intensity of the backscattered light, the optical fiber sensing apparatus 1200 senses that the vibration has occurred in optical fibers. Such an optical fiber sensor is called a distributed acoustic sensor (DAS) or the like.

As illustrated in FIG. 13, in a case where no vehicle is passing at the measurement point of interest, the vibration intensity of the optical fiber does not exceed the threshold and fluctuates as noise. As illustrated in FIG. 14, in a case where a vehicle is passing at the measurement point of interest, the vibration intensity of the optical fiber exceeds the threshold due to the vibration of the vehicle, and the optical fiber sensing apparatus 1200 senses that the vehicle has passed.

However, as illustrated in FIG. 15, the signal intensity is different depending on the vehicle type, and the optical fiber sensing apparatus 1200 has a problem in that a large-size vehicle can be detected because the signal intensity of the large-size vehicle exceeds the threshold, but a small-size vehicle cannot be detected because the signal intensity of the small-size vehicle does not exceed the threshold.

As illustrated in FIG. 16, the optical fiber sensing apparatus 1200 has a problem that a vehicle can be detected in a case where passing through a lane close to the optical fiber because the signal intensity of the vehicle exceeds the threshold, but the same vehicle cannot be detected in a case where passing through a lane far from the optical fiber because the signal intensity of the vehicle does not exceed the threshold.

As illustrated in FIG. 17, the frequency characteristic is different depending on the vehicle type at the time of passing through the measurement. Therefore, the optical fiber sensing apparatus 1200 cannot specify the vehicle type if whether the intensity exceeds the threshold is only measured.

(Description of Optical Fiber Sensing Apparatus According to Example Embodiment)

Figure 2:
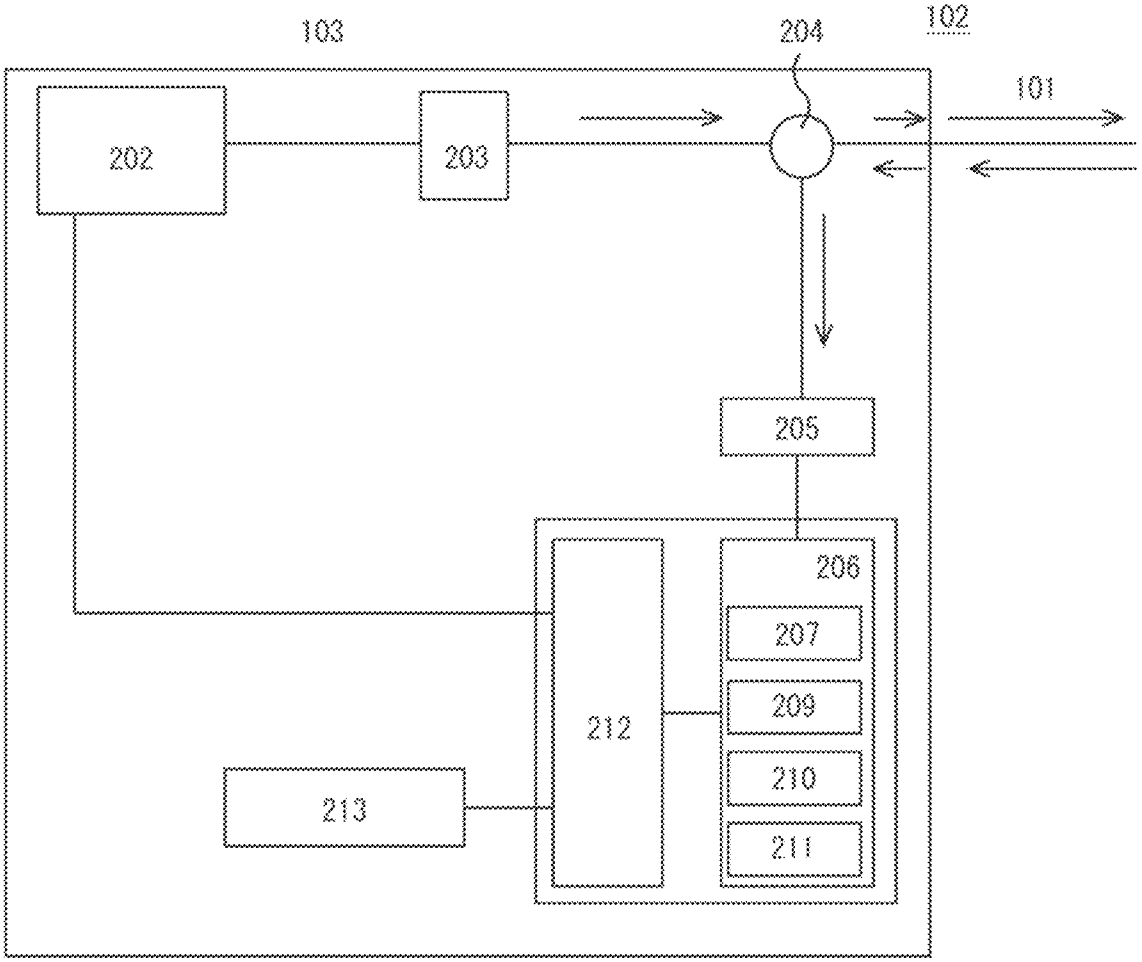
FIG. 2 is a block diagram of the travelling vehicle detection apparatus according to the example embodiment.
Figure 3:
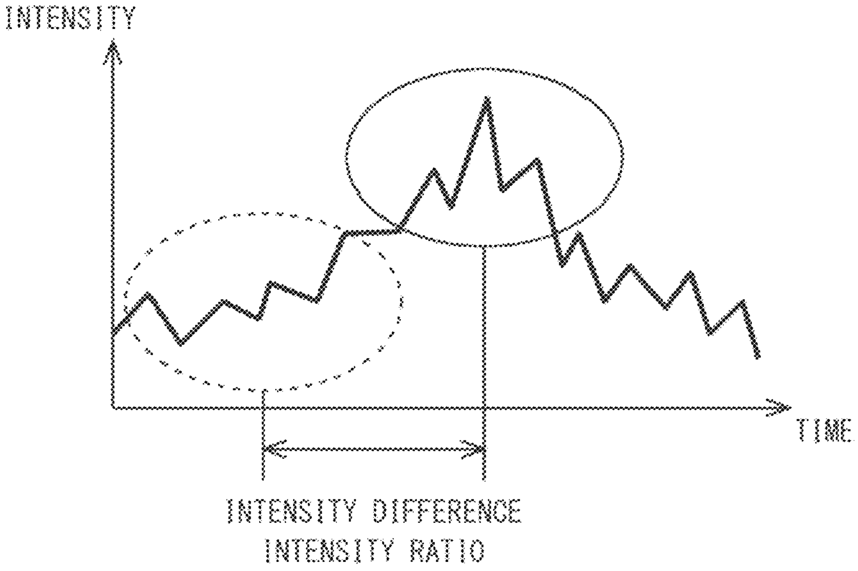
FIG. 3 is a diagram illustrating a measurement result at a place where there is one measurement point according to the example embodiment.
Figure 4:
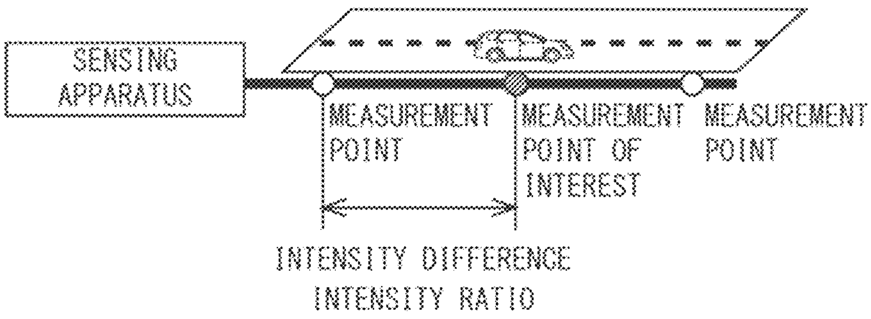
FIG. 4 is a diagram illustrating that measurement points are located at a plurality of places according to the example embodiment.

FIG. 1 is a schematic diagram of a travelling vehicle detection apparatus according to an example embodiment. FIG. 2 is a block diagram of an optical fiber sensor according to the example embodiment. FIG. 3 is a diagram illustrating a measurement result at a place where there is one measurement point according to the example embodiment. FIG. 4 is a diagram illustrating that measurement points are located at a plurality of places according to the example embodiment. A travelling vehicle detection apparatus according to the example embodiment will be described with reference to FIGS. 1 to 4.

As illustrated in FIG. 1, a travelling vehicle detection apparatus 100 includes an optical fiber cable 101 laid along a road and a sensing apparatus 102 connected to a terminal thereof.

As illustrated in FIG. 2, the sensing apparatus 102 includes a light source 202, an optical modulator 203, a circulator 204, an optical detector 205, a data processing unit 206, a control unit 212, and an output unit 213.

The optical fiber cable 101 is a linear cable that detects backscattered light (Rayleigh scattered light) of emitted laser light. The optical fiber cable 101 transmits light. As the optical fiber cable, a material capable of transmitting light, such as quartz glass or plastic formed in a fibrous shape, is used, and an optical fiber cable having a two-layer structure of a core in a center portion and a clad covering the periphery of the core is used. One end of the optical fiber cable 101 is connected to the circulator 204. The optical fiber cable 101 is disposed at a place where vibration is to be detected, in this case, beside a road.

The light source 202 is a laser light source having high coherence and a narrow line width. As the laser light source, a solid laser such as a ruby laser or a YAG laser, a liquid laser such as a dye laser, a gas laser such as an excimer laser or a $CO_2$ laser, a semiconductor laser, or the like can be used. The light source 202 oscillates pulsed light at a predetermined cycle toward the optical modulator 203 under the control of the control unit 212.

The optical modulator 203 is a device that modulates the pulsed light output from the light source 202. The optical modulator 203 can change the wavelength, frequency, intensity, phase, and the like of light under the control of the control unit 212. The pulsed light modulated by the optical modulator 203 is output to the circulator 204.

The circulator 204 is a device that emits the pulsed light output from the optical modulator 203 toward the optical fiber cable 101. The circulator 204 outputs the backscattered light returned from the optical fiber cable 101 toward the optical detector 205.

The optical detector 205 is a device that converts the received backscattered light into analog data. As the optical detector, for example, a photodiode can be used. The analog data output from the optical detector 205 is output to the data processing unit 206.

The data processing unit 206 includes an analog-digital conversion unit 207, a detection unit 209, a determination unit 210, and a storage unit 211. The data processing unit 206 is a device that includes a semiconductor integrated circuit or the like. The analog-digital conversion unit 207 is a device that converts the analog data output from the optical detector 205 into digital data. In cooperation with the control unit 212, the analog-digital conversion unit 207 processes the analog data related to the backscattered light output from the optical detector 205. The optical detector 205 and the analog-digital conversion unit 207 correspond to a measurement unit 208.

The detection unit 209 is a device that detects a feature amount from data measured by the measurement unit 208. The storage unit 211 is a device that stores feature amount data or a threshold obtained by machine learning, which is to be compared with the feature amount data measured by the measurement unit 208. The determination unit 210 is a device that determines whether there is a travelling vehicle by comparing the feature amount data measured by the measurement unit 208 with the feature amount data or the threshold stored in the storage unit 211.

Like the data processing unit 206, the control unit 212 is a device that includes a semiconductor integrated circuit. The control unit 212 is a central arithmetic processing apparatus capable of executing a program. Here, the digital data of the data processing unit 206 is controlled and processed.

The output unit 213 is a device such as a display apparatus or a speaker, and outputs data by display, voice, or the like.

A method of detecting vibration from a travelling vehicle by optical fiber sensing is the same as the related technology described above, and thus will not be described here.

The travelling vehicle detection apparatus 100 according to the example embodiment measures a temporal change in physical quantity at the measurement point of interest. In addition, the measurement points 1, 2, 3, and 4 are arranged at a plurality of places along the road, and the travelling vehicle detection apparatus 100 measures a change in physical quantity at each of the measurement points. Here, the physical quantity is preferably a vibration intensity.

The different measurement points are created by increasing the number of optical fibers (the number of channels) and synchronizing the sensing apparatuses. However, the different measurement points may be created from differences in return time of backscattered light of emitted laser light, and measurements may be taken simultaneously.

Next, the travelling vehicle detection apparatus 100 detects a change pattern of the physical quantity at different times or at different places. As illustrated in FIG. 3, one of the physical quantity change patterns is a change in vibration intensity (a change in absolute value of intensity or a change in intensity difference) and a change in vibration intensity ratio before and after the passage of the vehicle. This is defined as a feature amount. In addition, as illustrated in FIG. 4, one of the physical quantity change patterns is a change in vibration intensity and a change in vibration intensity ratio between a measurement point of interest and a measurement point before or after the measurement point of interest. This is defined as a feature amount. The change in vibration intensity and the change in intensity ratio are detected. In addition, a change in vibration intensity graph shape may be detected as a feature amount.

These feature amounts may be detected for each vibration frequency. The frequency is, for example, 0 to 10 Hz, 10 to 30 Hz, 30 to 50 Hz, 50 to 70 Hz, 70 to 100 Hz, 0 to 50 Hz, 50 to 100 Hz, 0 to 100 Hz, or the like.

As described above, these feature amounts may be detected for a current time and a past time. Furthermore, these feature amounts may be detected for a current time, a past time, and a future time. In a case where the future time is used, a delay occurs by a time interval until the referenced-to future. The feature of the travelling vehicle can be expressed by using feature amounts at multiple times.

As described above, these feature amounts may be detected for a measurement point of interest and a measurement point before or after the measurement point of interest. The feature of the travelling vehicle can be expressed by using feature amounts at multiple measurement points. In addition, as a feature amount, a change in vibration that indicates a vehicle speed may be used.

It is determined whether there is a travelling vehicle, by comparing the change pattern of the physical quantity with a spatiotemporal signal feature amount model that reflects the feature of the travelling vehicle measured in advance. The feature amount model is preferably created using supervised machine learning such as gradient boosting or random forest. However, the feature amount model may be created using unsupervised machine learning such as deep learning. A detection can be performed with high accuracy by comparison with the feature amount model created by machine learning, but a determination may be made only based on whether the feature amount exceeds the threshold.

Such a travelling vehicle detection apparatus can accurately detect a travelling vehicle.

(Travelling Vehicle Determination Method Using Travelling Vehicle Detection Apparatus According to First Example Embodiment)

Figure 5:
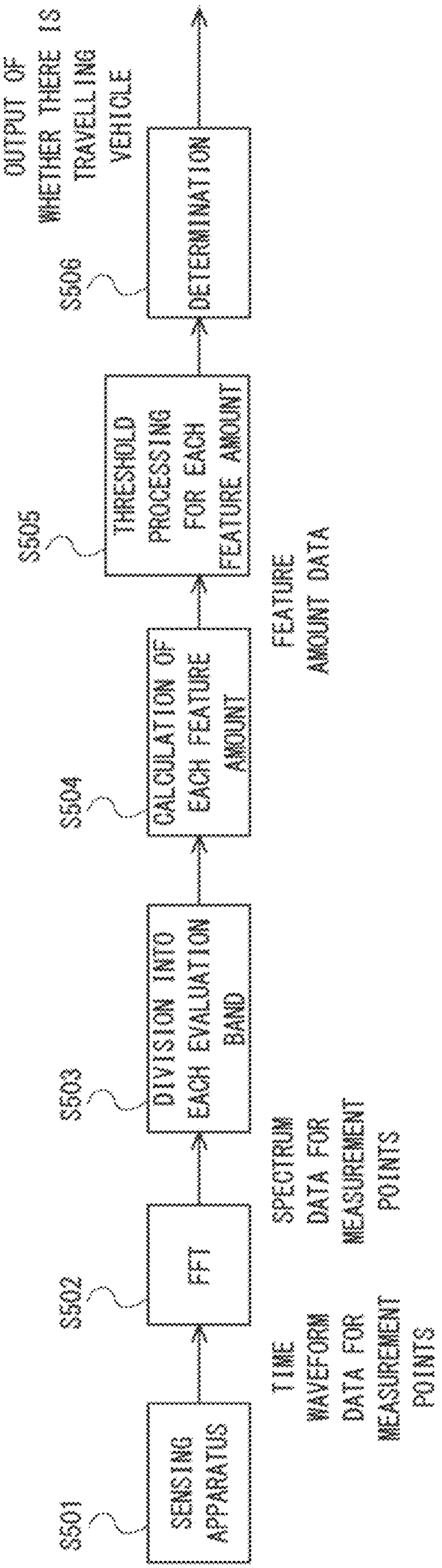
FIG. 5 is a block diagram illustrating a mode for threshold determination with respect to a feature amount according to a first example embodiment.

FIG. 5 is a block diagram illustrating a mode for threshold determination with respect to a feature amount according to a first example embodiment. A travelling vehicle determination method using a travelling vehicle detection apparatus according to the first example embodiment will be described with reference to FIG. 5.

As illustrated in FIG. 5, first, the sensing apparatus 102 according to the example embodiment acquires time waveform data on vibration intensity for measurement points (S501). Next, the obtained time waveform data is subjected to fast Fourier transform (FFT) to acquire spectrum data for the measurement points (S502). Next, the acquired spectrum data is divided into data for each vibration frequency evaluation band (S503). Next, each feature amount is calculated (S504). Next, threshold processing is performed for each feature amount (S505). Finally, it is determined whether there is a travelling vehicle based on whether the feature amount exceeds the threshold (S506).

In this way, the travelling vehicle detection apparatus can accurately detect the travelling vehicle.

(Travelling Vehicle Determination Method Using Travelling Vehicle Detection Apparatus According to Second Example Embodiment)

Figure 6:
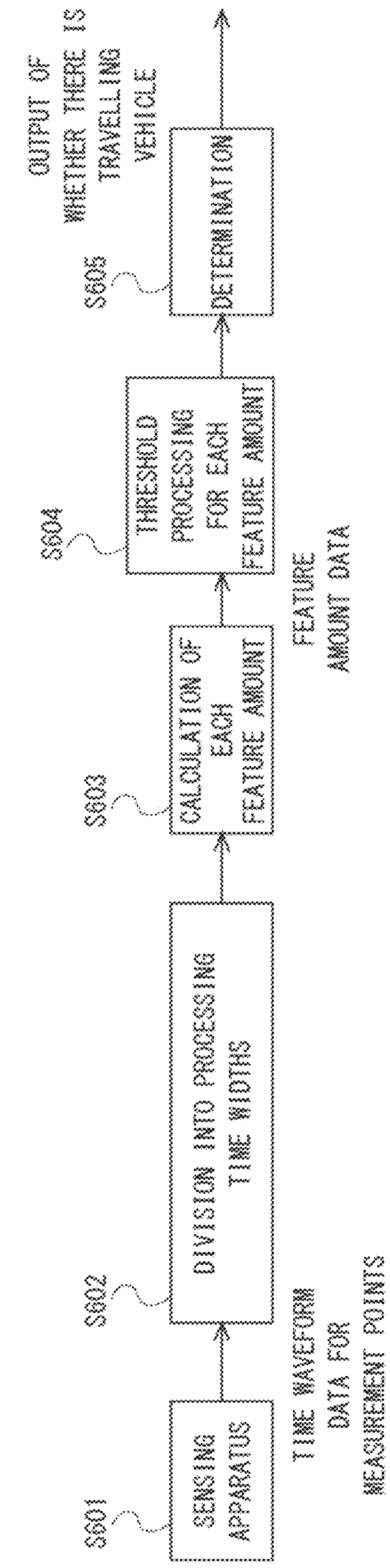
FIG. 6 is a block diagram illustrating a mode for threshold determination with respect to a feature amount according to a second example embodiment.

FIG. 6 is a block diagram illustrating a mode for threshold determination with respect to a feature amount according to a second example embodiment. A travelling vehicle determination method using a travelling vehicle detection apparatus according to the second example embodiment will be described with reference to FIG. 6.

As illustrated in FIG. 6, first, the sensing apparatus 102 according to the example embodiment acquires time waveform data on vibration intensity for measurement points (S601). Next, the obtained time waveform data is divided into processing time widths (S602). Next, each feature amount is calculated (S603). Next, threshold processing is performed for each feature amount (S604). Finally, it is determined whether there is a travelling vehicle based on whether the feature amount exceeds the threshold (S605).

In this way, the data can be easily processed without performing fast Fourier transform on the time waveform data on vibration intensity.

(Travelling Vehicle Determination Method Using Travelling Vehicle Detection Apparatus According to Third Example Embodiment)

Figure 7:
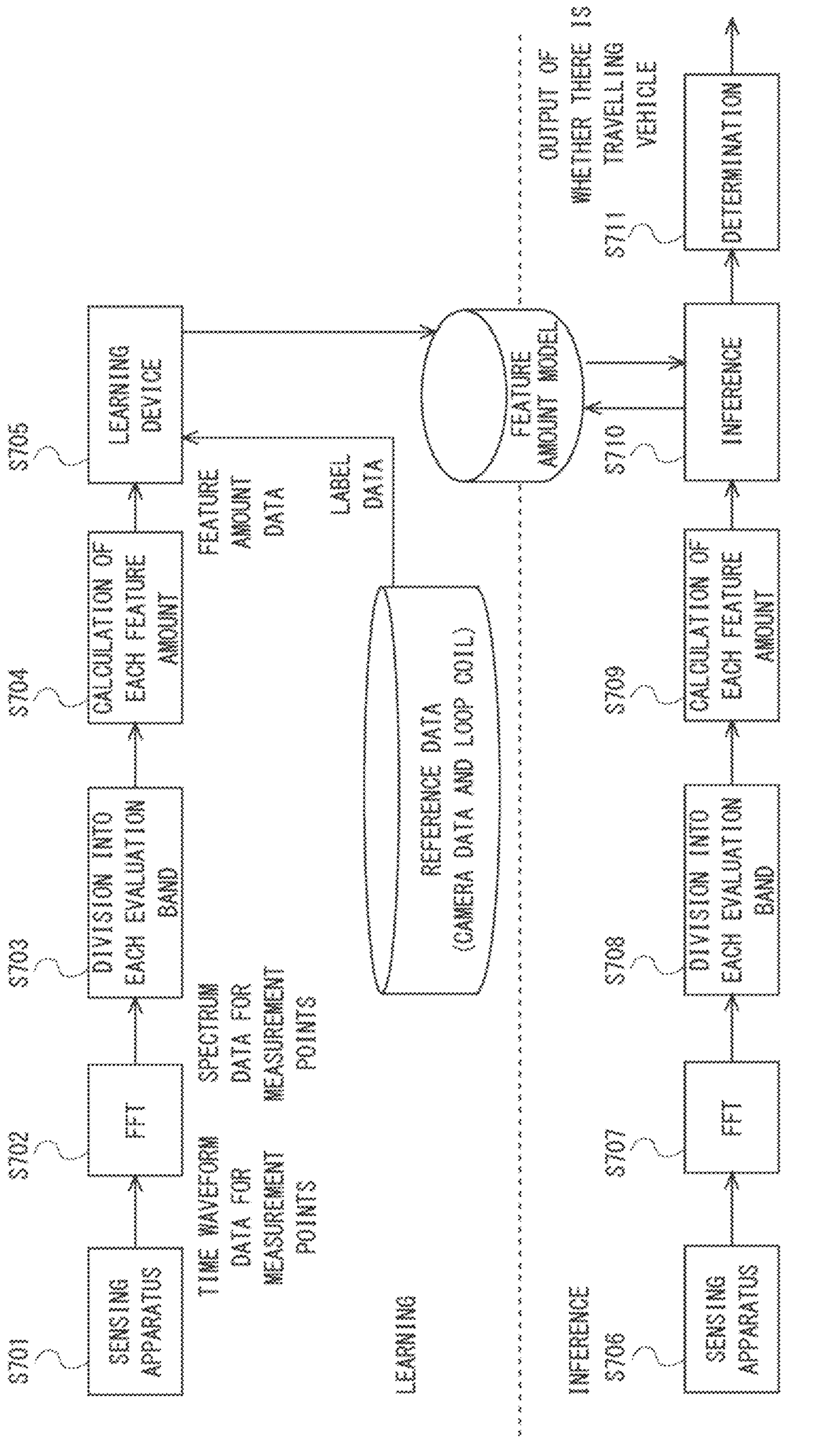
FIG. 7 is a block diagram illustrating a mode in which a feature amount is modeled by a learning device for use according to a third example embodiment.

FIG. 7 is a block diagram illustrating a mode in which a feature amount is modeled by a learning device for use according to a third example embodiment. A travelling vehicle determination method using a travelling vehicle detection apparatus according to the third example embodiment will be described with reference to FIG. 7.

As illustrated in FIG. 7, first, the sensing apparatus 102 according to the example embodiment acquires time waveform data on vibration intensity for measurement points as past data (S701). Next, the obtained time waveform data is subjected to fast Fourier transform (FFT) to acquire spectrum data for the measurement points (S702). Next, the acquired spectrum data is divided into data for each vibration frequency evaluation band (S703). Next, each feature amount is calculated (S704).

A feature amount model is created by performing supervised learning with a learning device to which label data and the obtained feature amount are input, the label data being reference data obtained from camera data and a loop coil to indicate whether there is a travelling vehicle (S705). These steps are executed in advance, and the feature amount model is created before an actual measurement.

Similarly, the sensing apparatus 102 according to the example embodiment acquires time waveform data on vibration intensity for measurement points as inference data (S706). Next, the obtained time waveform data is subjected to fast Fourier transform (FFT) to acquire spectrum data for the measurement points (S707). Next, the acquired spectrum data is divided into data for each vibration frequency band (S708). Next, each feature amount is calculated (S709).

Next, inference is performed by comparing the feature amount of the inference data with the feature amount model (S710). Finally, it is determined and output whether there is a travelling vehicle (S711). In this way, the travelling vehicle detection apparatus can detect the travelling vehicle more accurately than the threshold determination.

(Travelling Vehicle Determination Method Using Travelling Vehicle Detection Apparatus According to Fourth Example Embodiment)

Figure 8:
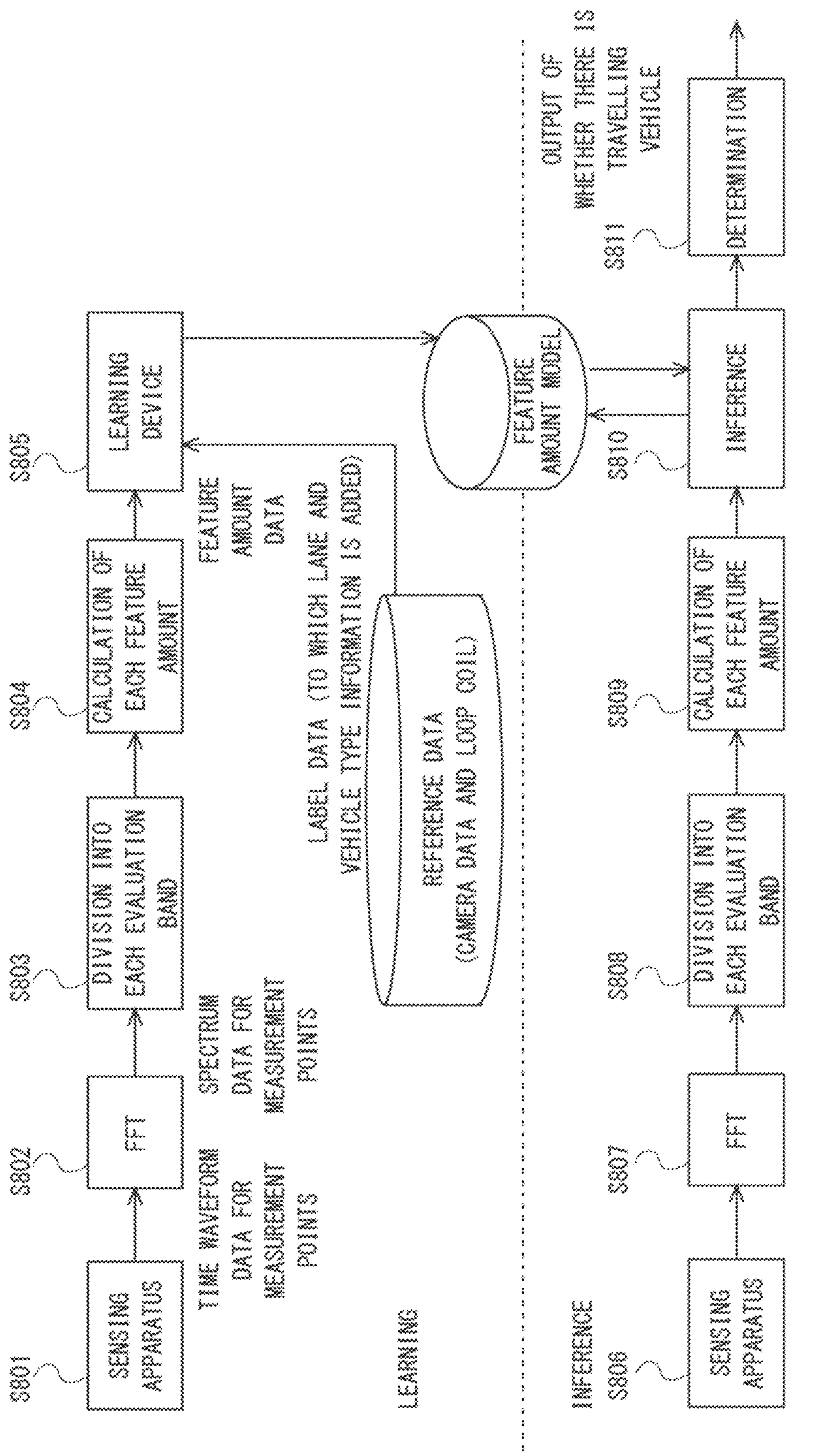
FIG. 8 is a block diagram illustrating a mode in which a feature amount is modeled by a learning device for use according to a fourth example embodiment.

FIG. 8 is a block diagram illustrating a mode in which a feature amount is modeled by a learning device for use according to a fourth example embodiment. A travelling vehicle determination method using a travelling vehicle detection apparatus according to the fourth example embodiment will be described with reference to FIG. 8. The fourth example embodiment is different from the third example embodiment in that it is determined whether there is a travelling vehicle for each lane and for each vehicle type. Therefore, only the differences of the fourth example embodiment from the third example embodiment will be described.

In the fourth example embodiment, travelling lane and vehicle type information is added to the label data. As a result, a feature amount model is created by performing supervised learning with a learning device to which label data and the obtained feature amount are input, the label data being obtained from camera data and a loop coil (S805).

Therefore, inference is performed by comparing the feature amount of the inference data with the feature amount model (S810), and it is determined whether there is a travelling vehicle for each travelling lane and for each vehicle type (S811).

In this manner, the travelling vehicle detection apparatus and the travelling vehicle detection method with high accuracy are provided through the threshold determination or using the learning device.

In addition, some or all of the processing in the travelling vehicle detection apparatus 100 described above can be realized as a computer program. Such a program can be stored and supplied to the computer using various types of non-transitory computer-readable media. The non-transitory computer-readable media include various types of tangible recording media. Examples of the non-transitory computer-readable media include a magnetic recording medium (e.g., a flexible disk, a magnetic tape, or a hard disk drive), a magneto-optical recording medium (e.g., a magneto-optical disc), a CD-read only memory (ROM), a CD-R, a CD-R/W, and a semiconductor memory (e.g., a mask ROM, a programmable ROM (PROM), an erasable PROM (EPROM), a flash ROM, or a random access memory (RAM)). In addition, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire or an optical fiber or a wireless communication path.

Such non-transitory computer-readable media may cause the travelling vehicle detection apparatus to perform the travelling vehicle detection method through the threshold determination or using the learning device.

Example

In the present example, measurements were performed at three measurement points: point 668 (−1), point 669, and point 670 (+1). In the present example, a vibration intensity, a vibration intensity difference, and a vibration intensity ratio for each frequency were used as feature amounts. In the present example, machine learning was performed by gradient boosting. In addition, in the present example, measurements were performed with a time resolution of 100 msec (10 pieces of data per 10 msec are used as one), a distance resolution of 3.2 m, and the number of channels of 3. The results are shown in Table 1 of FIG. 9.

This was used to evaluate how many passing vehicles can be detected for two lanes. The place was an expressway, the time was 15 minutes, and the number of passing vehicles was 189. The results are shown in Table 2 of FIG. 10.

It can be seen that the method of the present disclosure has a higher detection rate and a lower false detection rate than the comparison method. In particular, the method of the present disclosure could increase the detection rate in on a distant lane with a small signal, such as an opposite lane.

Figure 11:
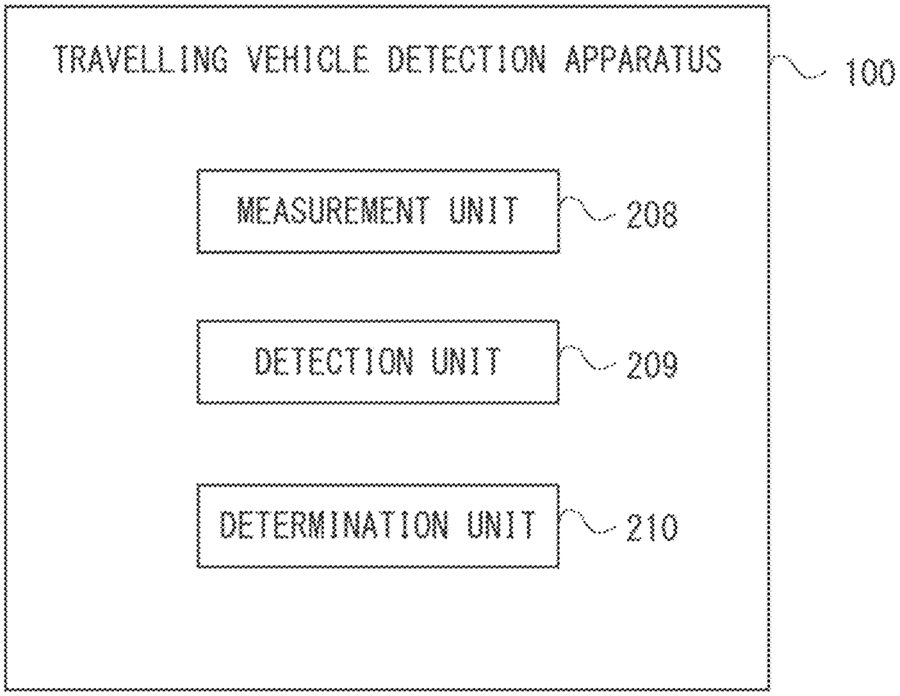
FIG. 11 is a block diagram of the travelling vehicle detection apparatus of the present disclosure.

FIG. 9 is a block diagram of the travelling vehicle detection apparatus of the present disclosure. The travelling vehicle detection apparatus of the present disclosure will be described with reference to FIG. 11.

The travelling vehicle detection apparatus 100 of the present disclosure includes a measurement unit 208 that measures a continuous physical quantity at a predetermined place using an optical fiber sensor laid along a road, a detection unit 209 that detects a temporal change pattern of the physical quantity from a measurement result of the measurement unit, and a determination unit 210 that determines whether there is a travelling vehicle based on the change pattern of the physical quantity.

Although the example embodiments of the present invention have been described above, the present invention includes appropriate modifications without impairing the objects and advantages thereof, and is not limited by the above example embodiments. For example, although threshold determination is performed in the second example embodiment, a determination may be made using the learning device as in the third and fourth example embodiments.

Some or all of the above-described example embodiments may be described as the following supplementary notes but are not limited to the following supplementary notes.

(Supplementary Note 1)

A travelling vehicle detection apparatus including:

a measurement unit configured to measure a continuous physical quantity at a predetermined place using an optical fiber sensor laid along a road;

a detection unit configured to detect a temporal change pattern of the physical quantity from a measurement result of the measurement unit; and a determination unit configured to determine whether there is a travelling vehicle based on the change pattern of the physical quantity.

(Supplementary Note 2)

The travelling vehicle detection apparatus according to supplementary note 1, in which there are a plurality of predetermined places arranged along the road.

(Supplementary Note 3)

The travelling vehicle detection apparatus according to supplementary note 1 or 2, in which the physical quantity is a vibration intensity, and the change pattern is a change in absolute value, a change in difference, a change in ratio, or a change in graph shape.

(Supplementary Note 4)

The travelling vehicle detection apparatus according to supplementary note 3, in which the detection unit detects the vibration intensity for each predetermined frequency band using fast Fourier transform.

(Supplementary Note 5)

The travelling vehicle detection apparatus according to any one of supplementary notes 1 to 4, in which the determination unit compares the change pattern of the physical quantity with a feature amount model of the physical quantity created using machine learning.

(Supplementary Note 6)

The travelling vehicle detection apparatus according to supplementary note 5, in which the machine learning is supervised machine learning.

(Supplementary Note 7)

The travelling vehicle detection apparatus according to any one of supplementary notes 1 to 6, in which the determination unit determines a vehicle type and a travelling lane of the travelling vehicle.

(Supplementary Note 8)

A travelling vehicle detection method including:

measuring a continuous physical quantity at a predetermined place using an optical fiber sensor laid along a road;

detecting a temporal change pattern of the physical quantity from a measurement result of the measurement; and determining whether there is a travelling vehicle based on the change pattern of the physical quantity.

(Supplementary Note 9)

The travelling vehicle detection method according to supplementary note 8, in which there are a plurality of predetermined places arranged along the road.

(Supplementary Note 10)

A non-transitory computer-readable medium recording a program for causing a travelling vehicle detection apparatus to execute:

measuring a continuous physical quantity at a predetermined place using an optical fiber sensor laid along a road;

detecting a temporal change pattern of the physical quantity from a measurement result of the measurement; and determining whether there is a travelling vehicle based on the change pattern of the physical quantity.

(Supplementary Note 11)

The travelling vehicle detection method according to supplementary note 8 or 9, in which the physical quantity is a vibration intensity, and the change pattern is a change in absolute value, a change in difference, a change in ratio, or a change in graph shape.

(Supplementary Note 12)

The travelling vehicle detection method according to the supplement 11, in which the detecting of the change pattern of the physical quantity includes detecting the vibration intensity for each predetermined frequency band using fast Fourier transform.

(Supplementary Note 13)

The travelling vehicle detection method according to supplementary note 8, 9, 11 or 12, in which the determining of whether there is a travelling vehicle includes comparing the change pattern of the physical quantity with a feature amount model of the physical quantity created using machine learning.

(Supplementary Note 14)

The travelling vehicle detection method according to supplementary note 13, in which the machine learning is supervised machine learning.

(Supplementary Note 15)

The travelling vehicle detection method according to any one of supplementary notes 8, 9, and 11 to 14, in which in the determining of whether there is a travelling vehicle, a vehicle type and a travelling lane of the travelling vehicle are determined.

(Supplementary Note 16)

The non-transitory computer-readable medium according to supplementary note 10, in which there are a plurality of predetermined places arranged along the road.

(Supplementary Note 17)

The non-transitory computer-readable medium according to supplementary note 10 or 16, in which the physical quantity is a vibration intensity, and the change pattern is a change in absolute value, a change in difference, a change in ratio, or a change in graph shape.

(Supplementary Note 18)

The non-transitory computer-readable medium according to supplementary note 17, in which the detecting of the change pattern of the physical quantity includes detecting the vibration intensity for each predetermined frequency band using fast Fourier transform.

(Supplementary Note 19)

The non-transitory computer-readable medium according to any one of supplementary notes 10 and 16 to 18, in which the determining of whether there is a travelling vehicle includes comparing the change pattern of the physical quantity with a feature amount model of the physical quantity created using machine learning.

(Supplementary Note 20)

The non-transitory computer-readable medium according to supplementary note 19, in which the machine learning is supervised machine learning.

(Supplementary Note 21)

The non-transitory computer-readable medium according to any one of supplementary notes 10 and 16 to 20, in which in the determining of whether there is a travelling vehicle, a vehicle type and a travelling lane of the travelling vehicle are determined.

REFERENCE SIGNS LIST

100 TRAVELLING VEHICLE DETECTION APPARATUS
101 OPTICAL FIBER CABLE
102 SENSING APPARATUS
202 LIGHT SOURCE
203 OPTICAL MODULATOR
204 CIRCULATOR
205 OPTICAL DETECTOR
206 DATA PROCESSING UNIT
207 ANALOG-DIGITAL CONVERSION UNIT
208 MEASUREMENT UNIT
209 DETECTION UNIT
210 DETERMINATION UNIT
211 STORAGE UNIT
212 CONTROL UNIT
213 OUTPUT UNIT
1000 OPTICAL FIBER SENSING APPARATUS
1001 OPTICAL FIBER CABLE
1002 SENSING APPARATUS

What is claimed is:

1. A travelling vehicle detection apparatus comprising:
a memory configured to store instructions; and
a processor configured to execute the instructions to:
measure a continuous physical quantity at a predetermined place using an optical fiber sensor laid along a road;
detect a temporal change pattern of the physical quantity from a measurement result; and
determine whether there is a travelling vehicle based on the change pattern of the physical quantity,
wherein there are a plurality of predetermined places arranged along the road,
wherein the physical quantity is a vibration intensity, and the change pattern is a change in absolute value, a change in difference, a change in ratio, or a change in graph shape,
wherein the detecting of the change pattern of the physical quantity includes acquiring time waveform data on the vibration intensity, acquiring spectrum data from the time waveform data using fast Fourier transform, dividing spectrum data into data for each predetermined vibration frequency band, and calculating each feature amount, and
wherein the determining of whether there is a travelling vehicle includes comparing the feature amount with a feature amount model of the physical quantity created using machine learning.

2. The travelling vehicle detection apparatus according to claim 1, wherein the machine learning is supervised machine learning.

3. The travelling vehicle detection apparatus according to claim 1, wherein in the determining of whether there is a travelling vehicle, a vehicle type and a travelling lane of the travelling vehicle is determined.

4. A travelling vehicle detection method comprising:
measuring a continuous physical quantity at a predetermined place using an optical fiber sensor laid along a road;
detecting a temporal change pattern of the physical quantity from a measurement result of the measurement; and
determining whether there is a travelling vehicle based on the change pattern of the physical quantity,
wherein there are a plurality of predetermined places arranged along the road,
wherein the physical quantity is a vibration intensity, and the change pattern is a change in absolute value, a change in difference, a change in ratio, or a change in graph shape,
wherein the detecting of the change pattern of the physical quantity includes acquiring time waveform data on the vibration intensity, acquiring spectrum data from the time waveform data using fast Fourier transform, dividing spectrum data into data for each predetermined vibration frequency band, and calculating each feature amount, and
wherein the determining of whether there is a travelling vehicle includes comparing the feature amount with a feature amount model of the physical quantity created using machine learning.

5. The travelling vehicle detection method according to claim 4, wherein the machine learning is supervised machine learning.

6. The travelling vehicle detection method according to claim 4, wherein in the determining of whether there is a travelling vehicle, a vehicle type and a travelling lane of the travelling vehicle are determined.

7. A non-transitory computer-readable medium recording a program for causing a travelling vehicle detection apparatus to execute:
measuring a continuous physical quantity at a predetermined place using an optical fiber sensor laid along a road;
detecting a temporal change pattern of the physical quantity from a measurement result of the measurement; and
determining whether there is a travelling vehicle based on the change pattern of the physical quantity,
wherein there are a plurality of predetermined places arranged along the road,
wherein the physical quantity is a vibration intensity, and the change pattern is a change in absolute value, a change in difference, a change in ratio, or a change in graph shape,
wherein the detecting of the change pattern of the physical quantity includes acquiring time waveform data on the vibration intensity, acquiring spectrum data from the time waveform data using fast Fourier transform, dividing spectrum data into data for each predetermined vibration frequency band, and calculating each feature amount, and wherein the determining of whether there is a travelling vehicle includes comparing the feature amount with a feature amount model of the physical quantity created using machine learning.

8. The non-transitory computer-readable medium according to claim 7, in which wherein the machine learning is supervised machine learning.

9. The non-transitory computer-readable medium according to claim 7, wherein in the determining of whether there is a travelling vehicle, a vehicle type and a travelling lane of the travelling vehicle are determined.

* * * * *